(12) United States Patent
Sergeev et al.

(10) Patent No.: US 11,537,480 B1
(45) Date of Patent: Dec. 27, 2022

(54) SYSTEMS AND METHODS OF BACKUP AND RECOVERY OF JOURNALING SYSTEMS

(71) Applicant: Acronis International GmBh, Shaffhausen (CH)

(72) Inventors: Alexey Sergeev, Moscow Region (RU); Konstantin Karikov, Moscow (RU); Stanislav Protasov, Moscow (RU); Serguei M. Beloussov, Costa Del Sol (SG); Maxim V. Lyadvinsky, Moscow (RU)

(73) Assignee: ACRONIS INTERNATIONAL GMBH

( * ) Notice: Subject to any disclaimer, the term of this patent is extended or adjusted under 35 U.S.C. 154(b) by 165 days.

(21) Appl. No.: 14/868,450

(22) Filed: Sep. 29, 2015

Related U.S. Application Data

(60) Provisional application No. 62/058,048, filed on Sep. 30, 2014.

(51) Int. Cl.
*G06F 16/30* (2019.01)
*G06F 11/14* (2006.01)

(52) U.S. Cl.
CPC ...... *G06F 11/1474* (2013.01); *G06F 11/1469* (2013.01); *G06F 2201/87* (2013.01)

(58) Field of Classification Search
CPC ............. G06F 11/1471; G06F 11/1474; G06F 16/113; G06F 11/1469; G06F 2201/87
See application file for complete search history.

(56) References Cited

U.S. PATENT DOCUMENTS

| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |
| 7,603,533 | B1 | 10/2009 | Tsypliaev et al. |
| 7,636,824 | B1 | 12/2009 | Tormasov |
| 7,650,473 | B1 | 1/2010 | Tormasov et al. |
| 7,721,138 | B1 | 5/2010 | Lyadvinsky et al. |
| 7,779,221 | B1 | 8/2010 | Tormasov et al. |
| 7,831,789 | B1 | 11/2010 | Tsypliaev et al. |

(Continued)

OTHER PUBLICATIONS

Article entitled ""Binary file comparison "out of memory", by psguru, dated Jun. 2, 2009.*

*Primary Examiner* — Mahesh H Dwivedi
(74) *Attorney, Agent, or Firm* — K&L Gates LLP

(57) ABSTRACT

In part, the disclosure relates to a backup and restoration system for a transactional log based journaling application. The system includes a transactional log backup process executing on one or more computing devices; an archive stored in non-transitory computer readable memory; and a binary difference file generator in electronic communication with the archive and responsive to instructions from the transactional log backup process. In one embodiment, the binary difference file generator includes a backup driver in electrical communication with and responsive to communication signals from the transactional backup process.

16 Claims, 8 Drawing Sheets

(56) References Cited

U.S. PATENT DOCUMENTS

| | | |
|---|---|---|
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,244,914 B1 * | 8/2012 | Nagarkar ............ G06Q 10/107 707/609 |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 2002/0103816 A1 * | 8/2002 | Ganesh ............... G06F 11/2066 |
| 2005/0268065 A1 * | 12/2005 | Awada ................ G06F 9/5077 711/173 |
| 2006/0225065 A1 | 10/2006 | Chandhok et al. |
| 2007/0022091 A1 * | 1/2007 | Styles ................ G06F 21/6227 |
| 2009/0157767 A1 * | 6/2009 | Doty ................... G06F 11/0751 |
| 2009/0307277 A1 * | 12/2009 | Grubov ............... G06F 11/1451 |
| 2010/0011178 A1 | 1/2010 | Feathergill |
| 2014/0172803 A1 * | 6/2014 | Diaconu ............ G06F 17/30088 707/649 |

* cited by examiner

SYSTEMS AND METHODS OF BACKUP AND RECOVERY OF JOURNALING SYSTEMS

CROSS-REFERENCE TO RELATED APPLICATIONS

This application claims priority to and the benefit of U.S. provisional patent application No. 62/058,048, filed on Sep. 30, 2014, the disclosure of which is herein incorporated by reference in its entirety.

TECHNICAL FIELD

The technical field may generally relate to a journaling system backup and restoration.

BACKGROUND

Currently, there are a number of conventional methods that relate to organization of data archiving. One of these is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive are archived, or stored somewhere once. After that, only that data that has been changed, or added, since the previous backup, or since the pervious incremental backup, is actually archived. Recovery of data from the archive typically involves merging of the original backup and the various incremental backups.

With respect to certain types of computer systems, such as email related systems and software additional challenges arise relating to backups. For example, given the volume of transactions, challenges arise with respect to database journaling systems. Such systems record every operation applied to the database records. These operations can be stored in log files which can become voluminous over time. Performing a backup of a journaling system with large numbers of log files can result in long delays and downtime as part of a restore or archive operation with respect to such a system.

Accordingly, there is a need for an effective and efficient method of performing archival and restore processes with respect to a journaling system.

BRIEF SUMMARY

In part, the disclosure relates to a method for backup and restoration of a database. The method includes: receiving n transactional logs from the database; saving the n transactional logs into an archive; and creating one or more binary difference files (DIFF) of the database from one or more of the n transactional logs. In one embodiment, the method includes storing the one or more DIFFs in a memory device. In one embodiment, the database runs on a first computing device. In one embodiment, one or more of the DIFFs is either an independent DIFF or an embedded DIFF. In one embodiment, one or more independent DIFFs are generated using a database file having a full database backup, a set of current backups of transactional logs, and a DIFF from a previous backup. In one embodiment, one or more embedded DIFFs are generated using a database file, a set of current backups of transactional logs, and a set of DIFFs from all previous backups.

In one embodiment, the method includes reducing processing load of the first computing device by replaying one or more of the transactional logs in the database using a second computing device. In one embodiment, the method includes tracking changes in the database using a file tracker driver since a previous backup. In one embodiment, the method includes receiving m transactional logs from the database; creating one or more binary difference files of the database using the file tracker driver; saving the one or more binary difference files created using the file tracker into the archive; and saving the m transactional logs into the archive.

In one embodiment, one or more of the transactional logs are generated using a transactional system or a journaling system. In one embodiment, the journaling system is New Technology File System. In one embodiment, the transactional system is an email exchange server-based system. In one embodiment, the method includes generating a circular log comprising a plurality of the transactional logs.

In part, the disclosure relates to a backup and restoration system for a transactional log based journaling application. The system includes a transactional log backup process executing on one or more computing devices; an archive stored in non-transitory computer readable memory; and a binary difference file generator in electronic communication with the archive and responsive to instructions from the transactional log backup process. In one embodiment, the binary difference file generator includes a backup driver in electrical communication with and responsive to communication signals from the transactional backup process. In one embodiment, the binary difference file generator includes an input component to receive one or more transactional logs and output one or more binary difference files (DIFFs).

In one embodiment, the one or more DIFFs is either an independent DIFF or an embedded DIFF. In one embodiment, the processing load of the first computing device is reduce by replaying one or more of the transactional logs in the database using the first computer device and deprioritizing the replaying of the one or more transactional logs such that the replaying utilizes only unused resources of the first computing device. In one embodiment, the method includes applying one or more of the transactional logs to generate one or more DIFFs.

DETAILED DESCRIPTION

A user may institute backup and recovery procedures to ensure persistence of applications, data, or other resources accessed through one or more machines such as computing devices. In one embodiment, the machine can be a virtual machine. Each machine or computing device, whether physical or virtual can run applications such as databases, log file generators, and other journaling system components. In part, the disclosure relates to methods of backing up and restoring such applications, files and other data stored on or otherwise used by such machines. For example, a backup archive of a machine may be created and stored onsite or offsite and may include the entire content of the physical or virtual machine before it failed. Efficient recovery of machines may be critical for proper business or other operations of an organization as application demands are likely to continue in the event of a physical or virtual machine failure. In the case of transactional systems such as journaling systems that generate transaction log files, additional challenges and problems arise. Specifically, the backup and recovery process be can time-consuming depending on the number of logs files that exist that need to be restored as entries in one or more databases.

In view of the forgoing, there is a need for a system in which the speed of a journaling system restore/recovery is increased. The various techniques described herein can be used with various types of journaling systems, including transactional databases such as Microsoft Exchange Server databases, Microsoft SQL, and Oracle databases, journaling file systems such as New Technology File systems, ext4, etc. and other databases or log file generating applications. In various implementations, the techniques and features described in the disclosure are directed towards increasing the speed of a backup and/or restoration of a database, a journaling system, or other log file generating systems. In part, this can be accomplished using the systems and methods described herein to reduce the number of log files or the amount of information obtained from a given log file.

Figure 1:
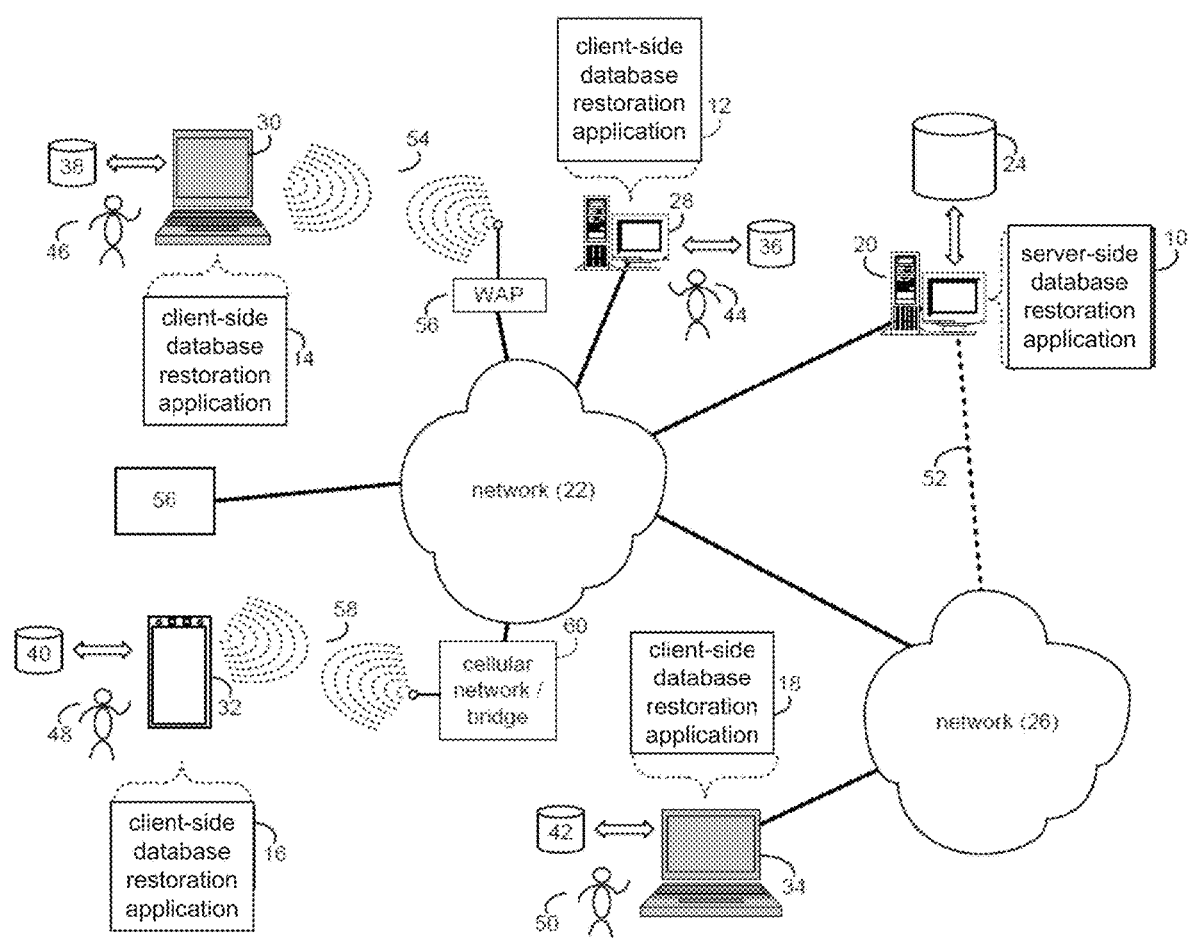
FIG. 1 depicts an example system that can execute implementations of the present disclosure.

Referring to FIG. 1, there is shown a server-side database backup/recovery application 10 and client-side database backup/recovery applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as file restoration process 10. Further, one or more of client applications 12, 14, 16, and 18 may be referred to as a process configured to carry out one or more of the features described herein, such as database restoration processes 12, 14, 16, and/or 18. The backup and restore processes described herein can be used with various suitable transactional systems that use one or more databases such as journaling systems with an email exchange system being an example thereof.

As will be discussed below and referring now to FIG. 2, database restoration process or application 10 is used to reduce the time for backup and recovery of a database by generating a binary difference of a pair of files. A difference can be an operation that identifies the differences between files at a suitable level such as a block level. A difference can also refer to a file that stores the differences identified with respect to such a pair of files after performing such a difference operation. As used herein, a difference or difference file including a binary difference file can be identified as a DIFF or DIFF file, interchangeably. The database restoration process or application 10 can include one or more of the following without limitation: journaling system backup and recovery software; email server backup and recovery software, backup and recovery software for log file or database dependent software applications.

The file restoration process may be a server-side process (e.g., server-side file restoration process 10), a client-side process (e.g., client-side file restoration process 12, client-side file restoration process 14, client-side file restoration process 16, or client-side file restoration process 18), or a hybrid server-side/client-side process (e.g., a combination of server-side database restoration process 10 and one or more of client-side database restoration processes 12, 14, 16, 18).

System Overview

Referring to FIG. 1, server-side database restoration process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side file restoration process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side database restoration processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side database restoration processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side database restoration processes 12, 14, 16, 18 and/or server-side database restoration process 10 may be processes that run within (i.e., are part of) a cloud computing site, cloud computing application, cloud platform, or cloud environment. Alternatively, client-side database restoration processes 12, 14, 16, 18 and/or server-side database restoration process 10 may be stand-alone applications that work in conjunction with the cloud computing site, cloud computing application, cloud platform, or cloud environment. One or more of client-side database restoration processes 12, 14, 16, 18 and server-side database restoration process 10 may interface with each other (via network 22 and/or network 26).

Users 44, 46, 48, 50 may access server-side database restoration process 10 directly through the device on which the client-side database restoration process (e.g., client-side file restoration processes 12, 14, 16, 18) is executed, namely client electronic devices 28, 30, 32, 34, for example. Users 44, 46, 48, 50 may access server-side database restoration process 10 directly through network 22 and/or through secondary network 26. Further, server computer 20 (i.e., the computer that executes server-side database restoration process 10) may be in communication with network 22 through secondary network 26, as illustrated with phantom link line 52.

The various client electronic devices may be directly or indirectly coupled to network 22 (or network 26). For example, personal computer 28 is shown directly coupled to a network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Database/Log File/Journaling System Backup and Restoration Processes

For the following discussion, server-side database restoration process 10 will be described for illustrative purposes and server computer 20 may run server-side database restoration application 10 to carry out some or all of the techniques and features described here. It should be noted that server-side database restoration process 10 may interact with client-side database restoration process 12 and may be executed within one or more applications that allow for communication with client-side database restoration process 12. However, this is not intended to be a limitation of this disclosure, as other configurations are possible (e.g., stand-alone, client-side database restoration processes and/or stand-alone server-side database restoration processes). For example, some implementations may include one or more of client-side database restoration processes 12, 14, 16, and 18 in place of or in addition to server-side database restoration process 10.

The systems and methods (e.g., database restoration process 10) described herein relate to the recovery of physical or virtual machines, physical or virtual machine files, databases, log files, and journaling system software applications and data. In part, the systems and methods relate to decreasing the recovery time for backing-up and restoring a database in one embodiment.

The systems described herein may include one or more memory elements and computing devices for backup of software, databases, log files, differences between files such as binary differences between files, and physical or virtual machines, and computer storage products including instructions to be executed by a processor to cause the processor to implement the methods described herein. As noted herein, a difference operation or a difference file such as a binary difference file operation can be referred to herein as a DIFF or DIFF file and are a representation of block by block differences between file generations or two different files.

Figure 2:
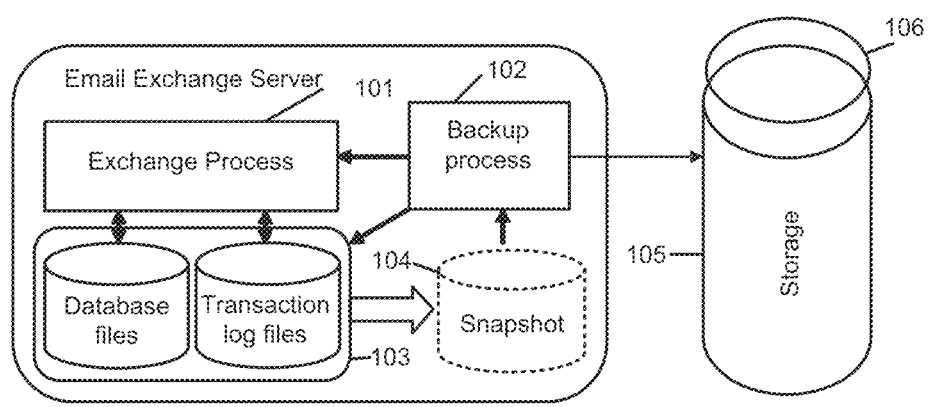
FIG. 2 depicts an example of a database restoration system in accordance with the present disclosure.

Referring now to FIG. 2, one embodiment of a database journaling system is illustrated. In this exemplary system, the database journaling system is an email exchange server that executes an exchange process such as a suitable email software application. A backup process 102 initiates a snapshot 104 interacting with the exchange process 101 and a data store 103 to contain the backup data generated using backup process 102. The snapshot 104 can include without limitation one or more of the state of the database, a system state or any information about the state of the system at the time of the creation of the snapshot 104. In one example, this process can result in the creation of transaction logs, or transaction logs can exist in the archive before the backup process 102 begins. The backup process 102 reads the necessary data from the snapshot 104 and stores it to an archive in storage 105 which communicates with a storage server 106 that manages the archives. The backup process can include components and steps to selectively manage log files using one or more of the file management processes described herein.

Figure 3:
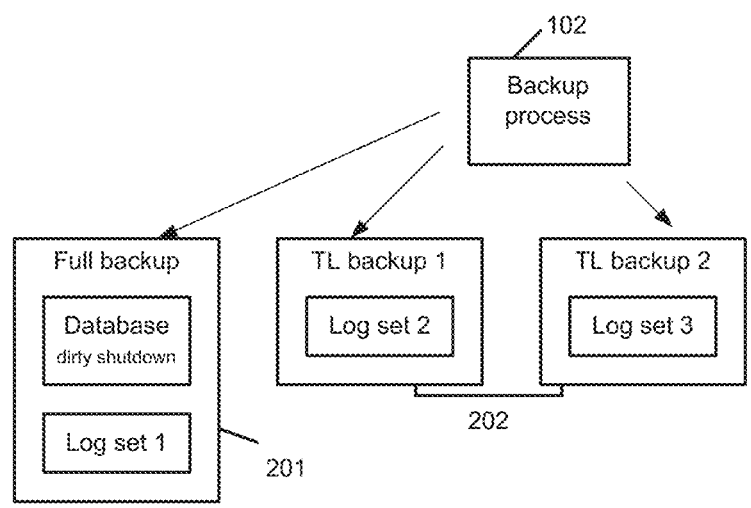
FIG. 3 depicts an example of a system for storing data in an archive in accordance with the present disclosure.

Referring now to FIG. 3, a system for storing data in an archive is illustrated. The system is used to record every operation that is applied to database records. In the case of a full backup of the database 201, the entire database and all the required logs are saved from the time of the backup. Log set 2 and log set 3 202 are sets of transactional logs (TL) from different points in time and include backup logs which are not present in the full backup of the database 201. A full back up or a differential backup of transactional logs such as TL backup 1 and TL backup 2 can be generated using backup process 102.

Figure 4:
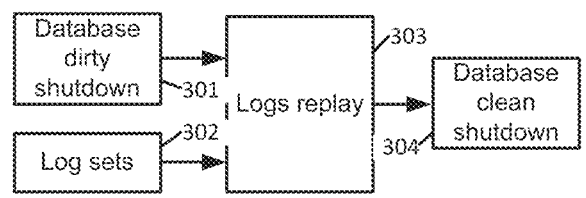
FIG. 4 is a flowchart illustrating an example process for restoring a database in accordance with the present disclosure.

Referring now to FIG. 4, an example of a process for restoring a database is illustrated. Depending on the type of restoration performed, various log sets are used to back up and restore the database. For example, a point in time restoration utilizes log sets 302 from all the previous logs, while a point of failure restoration utilizes all the logs sets 302 in the archive in addition to any logs stored on the live system that have not yet been backed up. For example, when restoring to a point in time after transactional log T2, the log set used for database recovery will include log set 1, log set 2, and a portion of log set 3 that was created before the point in time of the restoration. When restoring to a point of failure, the log set will include log set 1, log set 2, log set 3, and any logs from the system that had not yet been backed up.

FIG. 4 shows an embodiment of the process of database restore for two scenarios—a restore type that is initiated based on a selected pit in time (PIT) and a restore type that is initiated based on a fault or other point of failure (POF). Memory or transactions can be dirtied as a result of a failure and thus result in a dirty database shut down 301. A point in time restore can be used at any time and thus the database can be shut down in a clean state 304. Depending on the restore type (PIT or POF), Log set (302) is combined from all the previous logs in case of PIT restore, or alternatively from all the existing logs in archive and the logs which are stored on the live system (these logs were not backed up yet)—for the POF situation.

To minimize the number of logs that are replayed into a database, binary difference (DIFF) files of the database are created. Binary difference (DIFF) files can be the block by block differences between file generations or two different files or other file system objects. As noted above, the database may be the mailbox database for messages for an email server or other frequently updated or transactional intensive application having sets of log files generated over time. The DIFF files can recreate the state of a database at the moment of creation of the DIFF file when the DIFF file is applied to a previous backup of the database prior to the generation of new log files and the resultant DIFF file. For example, the backup and restoration of the database is using a previous full backup of the database and information regarding all the changed blocks in the database from the DIFF files. The database log files that are backed up by the process or agent 102 are those logs which are not part of the currently stored full database backup.

When restoring the database from a transactional log backup, the backup process 102 or backup agent performs the step of scanning the stored DIFF files from a prior backup and use such DIFF files of a set of transactional logs to replay a virtualized database from prior backups and the accumulated DIFF files to generate a restored database. Thus, the backup process uses a prior full database backup and subsequently stored TL diff files (TL1 DIFF+ . . . +TLn DIFF) for all n files stored only from the TL backup to restore the database to the desired recovery time. Using the DIFF files allows for a shorter recovery time relative to the longer recovery time of using an initial full backup of the database and all subsequent transactional logs (full database+TL1+ . . . +TLn). The backup process reduced recovery time as a result of being configured to operate using TLn DIFF files rather than using all TLn files.

As an example to assess the time savings in recovery times using the methods disclosed herein compared to methods in which they are not used, recovery of an Exchange DB (15 Gb) by performing a full backup has a first recovery time of about 11 minutes. In contrast to a full recovery of such an Exchange DB, performing a recovery of the same DB with one transactional log backup (1.8 Gb of logs) has a second recovery time of about 19 minutes. If an exemplary difference-based method disclosed herein is used, instead of being about 19 minutes, the second recovery is about equal to the first recovery time of about 11 minutes. As a result, in one embodiment, the methods described herein using DIFFs effectively decreases a typically recovery time by an amount corresponding to the recovery time associated with processing any transactional logs associated with the journaling system.

Figure 5:
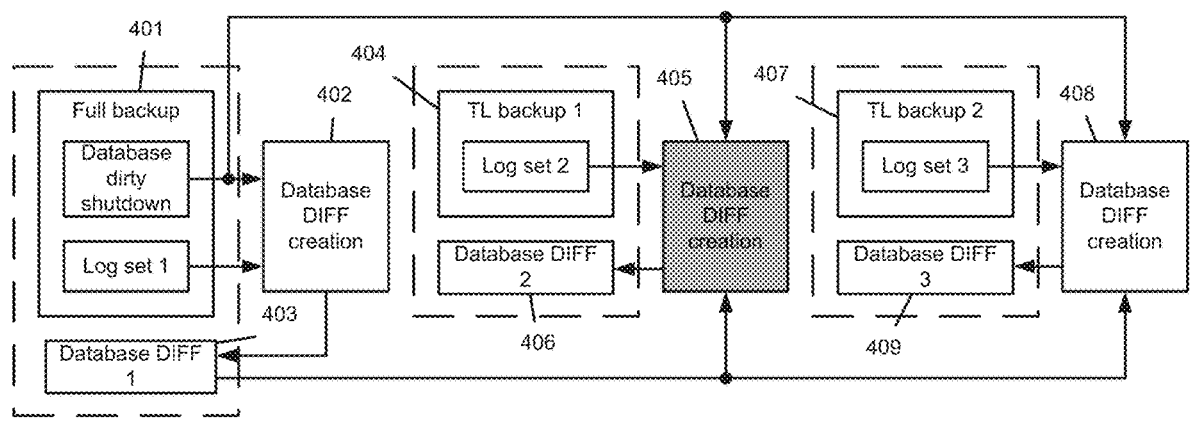
FIG. 5 is a flowchart illustrating an example process for archiving data in a database.

Referring now to FIG. 5, a database DIFF creation algorithm or process 402, 405 is used to process logs related to a database backup. The database DIFF creation algorithm 402, 405 creates DIFF files 403, 406, 409.

In one embodiment, the steps of the DIFF creation algorithm include one or more of virtualizing (or copying or mapping to RAM) the DB and the TL file(s); applying journal records (transactions) to DB using existing DB engine (ESE in case of Exchange) or method of committing the transactions; generating a difference (changed blocks) of DB file(s) from a base state (from FULL backup for independent DIFFs or another base DIFF for embedded ones) to a subsequent state after applying the transactions of the logs; and storing any changed blocks from the steps above into the archive.

The DIFF files can be created in a variety of ways, including independent DIFFs and embedded DIFFs. Only a single DIFF file is used in the case of an independent DIFF backup, and all the created DIFF files are used in the case of an embedded DIFF backup. For example, in the case of independent DIFFs, the database file 401, the current backup logs 404, 407, and a single DIFF from a previous backup are used. Either database DIFF1 403, database DIFF2 406, or database DIFF3 409 can be used depending on which DIFF file is the most recently created DIFF file. For example, in the case of embedded DIFFs, the database file 401, the current backup logs 404, 407, and the DIFFs from all the previous backups 403, 406, 409 are used. A DIFF can include all the changes between a baseline (full) backup and a point in time, for which it was created. A DIFF's accumulated changes can summarize a number of database transactions. In one embodiment, as shown in FIG. 5, the DIFF closest to a PIT can be used such as DIFF 1 (403) or DIFF 2 (406).

Figure 6:
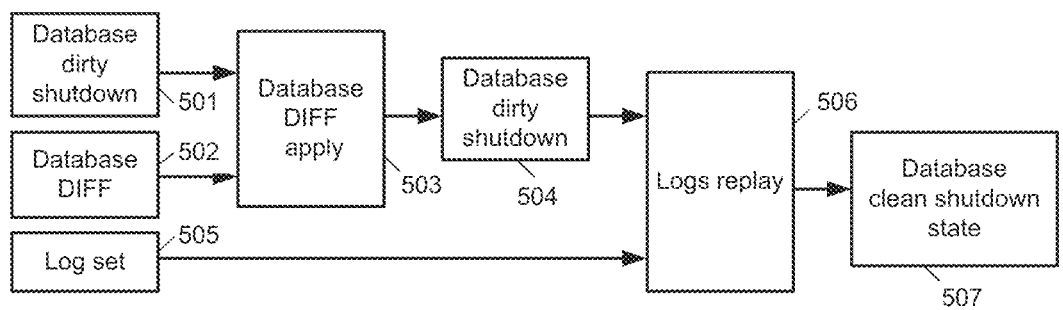
FIG. 6 is a flowchart illustrating an example process for recovering a database.

Referring to FIG. 6, the process of database recovery using DIFF files is illustrated. A database 504 can include several DIFF files 502 when using embedded DIFFs, or a single DIFF file when using independent DIFFs. If the restoration of the database is being done at a point in time for which a DIFF file 502 has already been created, there is no need to replay the logs 506. In one embodiment, replaying is performed by one or more database components, such as a database engine. In one embodiment, replaying is a process of transferring or moving transaction to a database. In one embodiment, an exemplary method applies all logs from nearest FULL or DIFF to a selected PIT. As a result, the backup software or DB engine knows which transactions must be applied to obtain the necessary state of DB and then obtain the appropriate DIFF.

After the logs are replayed or once the database has been restored, the database can be switched into a clean shutdown state 507. This can be achieved in a variety of ways. For example, a database DIFF can be created using background logs that are replayed in an archive, or a file tracking method can be used. The database clean shutdown state 507 is safe database state. In some cases, when a database is in a clean shutdown state it is not possible to replay log files into the database, thus switching to a clean shutdown state is avoided if replaying logs is part of backup process 102.

Figure 7A:
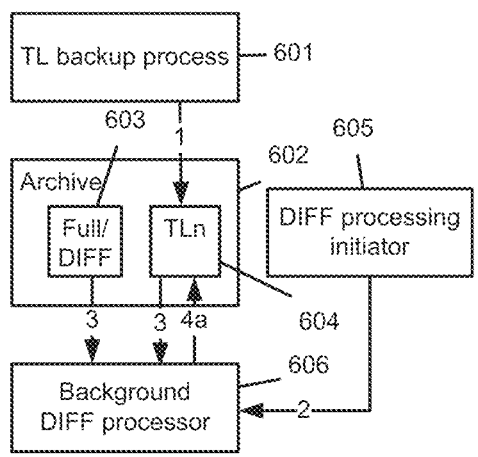
FIG. 7A depicts an example of a database recovery system in accordance with the disclosure that utilizes a background process.
Figure 7B:
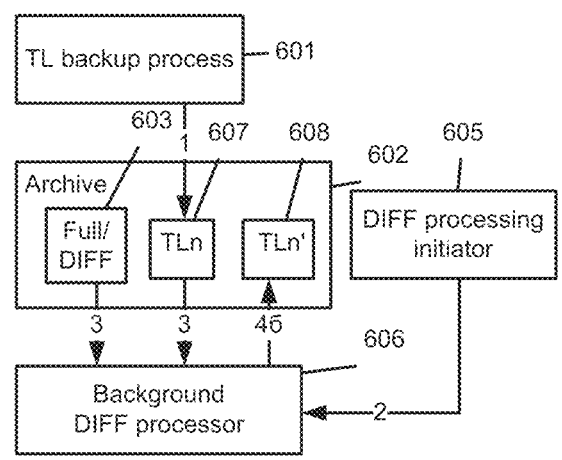
FIG. 7B depicts another example of a database recovery system in accordance with the disclosure that utilizes a background process.

FIGS. 7A-7B illustrate an exemplary database restoration process using the background log method as mentioned above. In the case that logs are replayed in a background mode, the transactional log process 601 defines the required logs and creates a transactional log slice, such as a backup slice 604, as shown in FIG. 7A, or a backup slice 607, as shown in FIG. 7B. These backup slices 604, 607 are created in the archive 602, and the transactional logs are written therein. A slice typically refers to a current set of information and referred to in the context of a baseline or previous slice. A current slice includes journal records newer than ones stored in that base slice. In one embodiment, a slice is archived copy of the data (DB) state at some point-in-time, e.g. copy of a snapshot. A slice can also refer to a backup generally as described herein.

Then, on the archive side, a DIFF processing initiator 605 runs a background process 606 that creates the DIFF files. This process is activated by a certain specific algorithm within the DIFF processing initiator 605. The algorithm controls the creation of the DIFF file based on a variety of criteria, including a scheduled period of time, on the size of the backed-up data, or the logs can be replaying simultaneously with the log backup process. The background process 606 applies all the previous DIFF files 603, if any exist, in the case of the embedded DIFF method and replays the logs into the database 603.

In the case of the independent DIFF method, only the latest DIFF file is applied by the background process 606. This process results in the calculation of a new DIFF file. The DIFF file that is created as a result of running the algorithm by the DIFF processing initiator 605 can either be saved into the existing archive slice 604 as shown in FIG. 7A, or in a newly created slice 608 as shown in FIG. 7B. The background process 606 replays the logs from the current slice 604, 607 to the database from the latest full backup 603 and from the latest DIFF file 603, both saved in the archive 602. This process can be repeated until all of the slices of the database have been processed. A TL can include a transaction in a native format of DB. In one embodiment, a DIFF is binary difference of DB file(s) generations before that TLs being applied compared to the file generations after the TL has been applied.

In one embodiment, the background process 606 which initiates the replay of the logs does not switch the database into a clean shutdown state. The created DIFF file can be reused for the further logs replays in the transactional logs backups. In this case all of the transaction logs are placed in the database.

Using the method of replaying the background logs into the archive, the database, such as a mail exchange server, is not subject to the processing load of handling the log replay function because the replaying of the logs is performed in the archive when there is a dedicated server for storing and managing the archive. The dedicated server includes another database engine or replay handler to offload the responsibility of replaying logs from the database being restored. In one embodiment, the archive server handles log replay and includes an interface for exchanging data with the database such as the ESE API for the Exchange server, which processes the archive. In another embodiment, there is no dedicated server and the background process can be run on the database server, for example, during idle time of the database server or with a low priority such that the background process utilizes unused database server resources.

Figure 8:
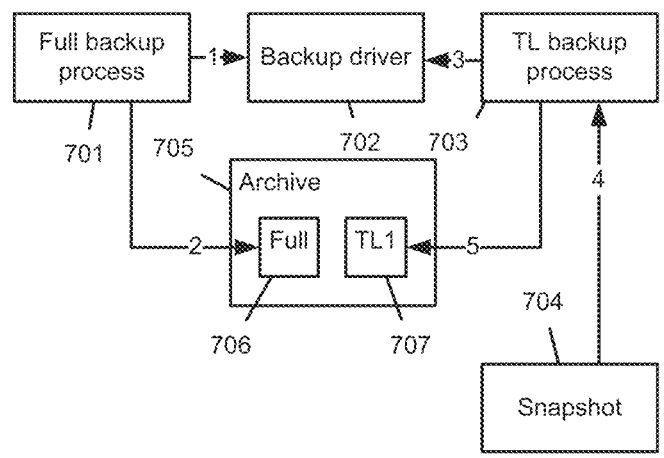
FIG. 8 depicts another example of a database recovery system in accordance with the disclosure that utilizes a file tracker to track the differences in a database.

FIG. 8 illustrates an exemplary database restoration process using the file tracking method as mentioned above. Rather than provide a separate log replay in the database, the file tracking method utilizes a file tracker driver 702, which tracks the changes in the database since the last backup 701, either a full backup or a backup of transactional logs. During the next transactional log backup 703, not only are the required logs copied into archive, but the DIFF file formed based upon information received from the file tracker driver 702 is also copied into the archive. This DIFF file characterizes the state of the database at the time of the backup 703. Using this method, time is not spent replaying the logs on the archive side because they were already replayed by the server running the database being restored. The results of logs replay are generated from the file tracker driver 702.

Referring again to FIG. 8, using the file tracking method, a full backup process 701 requests that the file tracker driver 702 tracks any changes in the database files. The full backup process 701 creates a full backup slice 706 in an archive 705. A transactional log backup process 703 requests information from the file tracker driver 702 about the numbers of regions in the database which were changed during previous full backup process 701. The transactional log backup process 703 reads from a snapshot 704 the regions that have been changed using the information from the file tracker driver 702, which results in the database DIFF file. The transactional log backup process 703 creates a transactional log backup slice 707, and writes the logs from the last backup and the DIFF files created into the backup slice 707.

Using the file tracking method, time is not spent for manual logs being replayed, and there is no need to modify the closed slice backups because the DIFF files are written during the backup. It is possible that the server can be overloaded during the backup because of the intense DIFF file creation, the transactional log backup time can increase, choosing periods for DIFF file creation can be inflexible. In addition, when recovering to Full/TL backups to a certain point, either point in time or point of failure, it can be necessary to replay some small set of required logs.

It is possible to combine the two previous described methods and use both the background log and file tracking methods together. For example, transaction log backup and database DIFF files can be created using the file tracking method, and between two backups using the file tracking method, the background process of the background log method can create additional database DIFF files that are saved into the archive. Therefore, an optimization of restore/recovery in the point of time (PIT) scenario is performed.

The approach proposed herein for the creation of database DIFF files can be applied for differential backups, where each subsequent backup contains a difference with database full backup.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts.

JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for backup and restoration of a transactional log-based journaling application comprising a database, the method comprising:
   running the database on a first computing device;
   receiving n transactional logs from the database;
   saving the n transactional logs into an archive;
   tracking changes in the database using a file tracker driver since a previous backup;
   minimizing the number of transactional logs replayed into database by creating one or more binary difference files (DIFF);
   creating, using the binary difference file generator and changes tracked using the file tracker driver, the one or more binary difference files (DIFF) of the database from one or more of the n transactional logs;
   saving the one or more DIFF;
   selecting a restore type that is initiated based on a selected point in time and using a first set of DIFF for a first restore process or
   selecting a restore type that is initiated based on a fault or other point of failure and using a second set of DIFF for a second restore process; and
   reducing processing load on the first computing device by restoring one or more transactions to the database using the first set of DIFF or the second set of DIFF instead of the transactional logs and deprioritizing the replaying of the one or more transactional logs such that the replaying utilizes only unused resources of the first computing device.

2. The method of claim 1 further comprising storing the one or more DIFFs in a memory device of a second computing device.

3. The method of claim 1 wherein the database is a mailbox database for an email server.

4. The method of claim 1 wherein one or more of the DIFFs is either an independent DIFF or an embedded DIFF.

5. The method of claim 4 wherein one or more independent DIFFs are generated using a database file having a full database backup, a set of current backups of transactional logs, and a DIFF from a previous backup.

6. The method of claim 4 wherein one or more embedded DIFFs are generated using a database file, a set of current backups of transactional logs, and a set of DIFFs from all previous backups.

7. The method of claim 1 further comprising
   receiving m transactional logs from the database;
   creating one or more binary difference files of the database using the file tracker driver;
   saving the one or more DIFFS created using the file tracker into the archive; and
   saving the m transactional logs into the archive.

8. The method of claim 1 wherein one or more of the transactional logs are generated using a transactional system or a journaling system.

9. The method of claim 8 wherein the journaling system is New Technology File System.

10. The method of claim 8 wherein the transactional system is an email exchange server-based system.

11. The method of claim 1 further comprising generating a circular log comprising a plurality of the transactional logs.

12. A backup and restoration system for a transactional log based journaling application having a database comprising
   a transactional log backup and restore process executing on one or more computing devices, wherein the transactional log backup and restore process selects a restore type that is initiated based on a selected point in time and using a first set of binary difference files (DIFF) for a first restore process or selecting a restore type that is initiated based on a fault or other point of failure and using a second set of DIFF for a second restore process;
   an archive stored in non-transitory computer readable memory at a server;
   a file tracker driver in electrical communication with and responsive to communication signals from the transactional backup process, wherein the file tracker driver is programmed to track changes in the database following a backup; and
   a binary difference file generator at the server and in electronic communication with the archive and responsive to instructions from the transactional log backup process, wherein the binary difference file generator creates one DIFF of the database from one or more transactional logs of the database and the changes tracked by the file tracker driver, wherein the database runs on a first computing device, wherein the one or more DIFF comprise block by block differences relative to the database; wherein the transactional log backup and restore process is configured to reduce processing load on the first computing device by restoring one or more transactions to the database using the one or more DIFF instead of the transactional logs, wherein a plurality of DIFF is used to replay a virtualized database from prior backups and accumulated DIFF files to generate a restored database wherein the processing load of the first computing device is reduced by deprioritizing the replaying of the one or more transactional logs such that the replaying utilizes only unused resources of the first computing device.

13. The system of claim 12 wherein the binary difference file generator comprises an input component to receive the one or more transactional logs and output the one or more DIFFs.

14. The system of claim 13 wherein the one or more DIFFs is either an independent DIFF or an embedded DIFF.

15. The method of claim 1 further comprising applying one or more of the transactional logs to generate the one or more DIFFs.

16. A backup and restoration system comprising
a database comprising n transactional logs;
a file tracker driver, wherein the file tracker driver is programmed to track changes in the database following a backup;
a server comprising one or more processors, an archive running on the one or more processors, a binary difference file generator running on the one or more processors, wherein the binary difference file generator is configured to generate, using the file tracker driver, one or more binary difference files (DIFF) of the database from one or more of the n transactional log; and
a transactional log backup and restore process executing on one or more computing devices, wherein the transactional log backup and restore process selects a restore type that is initiated based on a selected point in time and using a first set of binary difference files (DIFF) for a first restore process or selecting a restore type that is initiated based on a fault or other point of failure and using a second set of DIFF for a second restore process; wherein the transactional log backup and restore process is configured to reduce processing load on the one or more computing devices by restoring one or more transactions to the database using the one or more DIFF instead of the transactional logs wherein the processing load of the first computing device is reduced by deprioritizing the replaying of the one or more transactional logs such that the replaying utilizes only unused resources of one or more computing devices.

* * * * *